(12) United States Patent
Von Haden et al.

(10) Patent No.: US 11,061,956 B2
(45) Date of Patent: Jul. 13, 2021

(54) ENHANCED PROCESSING AND COMMUNICATION OF FILE CONTENT FOR ANALYSIS

(71) Applicant: MICROSOFT TECHNOLOGY LICENSING, LLC, Redmond, WA (US)

(72) Inventors: Kyle Matthew Von Haden, Dublin (IE); Igor Ralic, Dublin (IE); Paul Barnes, Dublin (IE); Ali Taleghani, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/951,086

(22) Filed: Apr. 11, 2018

(65) Prior Publication Data

US 2019/0179680 A1    Jun. 13, 2019

Related U.S. Application Data

(60) Provisional application No. 62/598,459, filed on Dec. 13, 2017.

(51) Int. Cl.
*G06F 3/00* (2006.01)
*G06F 16/36* (2019.01)
(Continued)

(52) U.S. Cl.
CPC ............ *G06F 16/36* (2019.01); *G06F 3/0482* (2013.01); *G06F 3/0483* (2013.01);
(Continued)

(58) Field of Classification Search
CPC ......... G06F 9/54; G06F 9/5038; G06F 40/106
(Continued)

(56) References Cited

U.S. PATENT DOCUMENTS

| 5,287,278 A | 2/1994 | Rau |
| 5,787,451 A | 7/1998 | Mogilevsky |

(Continued)

FOREIGN PATENT DOCUMENTS

| WO | 1997038376 A2 | 10/1997 |
| WO | 0041095 A2 | 7/2000 |
| WO | 2009041220 A1 | 4/2009 |

OTHER PUBLICATIONS

Kristi McCombs, WebGUI Administrators Guide, (Year: 2007).*
(Continued)

*Primary Examiner* — Lechi Truong
(74) *Attorney, Agent, or Firm* — Newport IP, LLC; Jacob P. Rohwer; David W. Foster

(57) ABSTRACT

The following disclosure provides a system that filters and batches changes to improve communication between an application and an add-in. In some embodiments, the application batches a threshold number of changes made to a section of content. Using a threshold regulates the rate of updates to the add-in. In some embodiments, changes can be filtered based on the type of change (e.g. text changes, style changes, etc.) or the type of input that caused the change (e.g. keyboard input, cut and paste command, etc.). Filtering changes can reduce traffic between the application and the add-in, preventing the add-in from being overwhelmed and improving application responsiveness.

19 Claims, 8 Drawing Sheets

(51) Int. Cl.

| | |
|---|---|
| *G06F 16/31* | (2019.01) |
| *G06Q 10/10* | (2012.01) |
| *G06F 40/30* | (2020.01) |
| *G06F 40/106* | (2020.01) |
| *G06F 40/134* | (2020.01) |
| *G06F 40/232* | (2020.01) |
| *G06F 40/242* | (2020.01) |
| *G06F 40/247* | (2020.01) |
| *G06F 40/253* | (2020.01) |
| *G06F 9/451* | (2018.01) |
| *G06F 3/0482* | (2013.01) |
| *G06F 3/0483* | (2013.01) |
| *G06F 3/0484* | (2013.01) |
| *G06F 9/445* | (2018.01) |
| *G06F 9/50* | (2006.01) |
| *G06F 9/54* | (2006.01) |
| *G06F 11/30* | (2006.01) |
| *G06F 40/166* | (2020.01) |

(52) U.S. Cl.
CPC ...... *G06F 3/04842* (2013.01); *G06F 9/44526* (2013.01); *G06F 9/453* (2018.02); *G06F 9/5038* (2013.01); *G06F 9/541* (2013.01); *G06F 11/302* (2013.01); *G06F 16/31* (2019.01); *G06F 40/106* (2020.01); *G06F 40/134* (2020.01); *G06F 40/232* (2020.01); *G06F 40/242* (2020.01); *G06F 40/247* (2020.01); *G06F 40/253* (2020.01); *G06F 40/30* (2020.01); *G06Q 10/10* (2013.01); *G06F 40/166* (2020.01)

(58) Field of Classification Search
USPC .......................................................... 719/310
See application file for complete search history.

(56) References Cited

U.S. PATENT DOCUMENTS

| | | | | |
|---|---|---|---|---|
| 6,199,081 | B1* | 3/2001 | Meyerzon | G06F 17/218 |
| | | | | 707/999.006 |
| 6,535,906 | B1* | 3/2003 | Barber | H04N 1/00209 |
| | | | | 358/434 |
| 6,785,869 | B1 | 8/2004 | Berstis | |
| 7,136,876 | B1 | 11/2006 | Adar et al. | |
| 7,236,923 | B1 | 6/2007 | Gupta | |
| 7,793,224 | B1* | 9/2010 | Ayers | G06F 17/211 |
| | | | | 715/249 |
| 8,316,007 | B2 | 11/2012 | Liao | |
| 8,667,487 | B1 | 3/2014 | Boodman et al. | |
| 8,739,249 | B1 | 5/2014 | Kay et al. | |
| 9,020,805 | B2 | 4/2015 | Boguraev et al. | |
| 9,098,500 | B1 | 8/2015 | Asokan et al. | |
| 9,311,286 | B2 | 4/2016 | Bank et al. | |
| 9,864,741 | B2 | 1/2018 | Mahmud et al. | |
| 10,789,147 | B1* | 9/2020 | Patzer | G06F 16/00 |
| 2002/0059251 | A1 | 5/2002 | Stern et al. | |
| 2004/0205672 | A1 | 10/2004 | Bates et al. | |
| 2005/0165778 | A1* | 7/2005 | Obata | G06F 16/951 |
| 2005/0240664 | A1 | 10/2005 | Chen et al. | |
| 2007/0016625 | A1 | 1/2007 | Berstis | |
| 2007/0124375 | A1 | 5/2007 | Vasudevan et al. | |
| 2007/0174045 | A1 | 7/2007 | Kao et al. | |
| 2008/0059539 | A1* | 3/2008 | Chin | G06Q 10/10 |
| 2008/0086297 | A1 | 4/2008 | Li et al. | |
| 2008/0159633 | A1 | 7/2008 | van eikeren et al. | |
| 2009/0313245 | A1* | 12/2009 | Weyl | G06K 9/00463 |
| 2010/0318897 | A1* | 12/2010 | Wang | G06F 16/93 |
| | | | | 715/234 |
| 2011/0047457 | A1 | 2/2011 | Flint et al. | |
| 2011/0320408 | A1* | 12/2011 | Grosse | G06F 16/958 |
| | | | | 707/661 |
| 2011/0320459 | A1 | 12/2011 | Chisholm | |
| 2012/0109974 | A1 | 5/2012 | Feng et al. | |
| 2012/0278694 | A1 | 11/2012 | Washio | |
| 2012/0290950 | A1 | 11/2012 | Rapaport et al. | |
| 2013/0110500 | A1 | 5/2013 | Feng et al. | |
| 2013/0191739 | A1 | 7/2013 | Bank et al. | |
| 2014/0074860 | A1 | 3/2014 | Medelyan | |
| 2014/0074886 | A1 | 3/2014 | Medelyan et al. | |
| 2015/0066480 | A1 | 3/2015 | Endo et al. | |
| 2015/0088493 | A1 | 3/2015 | Thakore | |
| 2015/0234809 | A1 | 8/2015 | Moore et al. | |
| 2015/0309667 | A1 | 10/2015 | Wang | |
| 2015/0317390 | A1 | 11/2015 | Mills et al. | |
| 2016/0105386 | A1 | 4/2016 | Anders et al. | |
| 2016/0283839 | A1 | 9/2016 | Ye et al. | |
| 2017/0199963 | A1 | 7/2017 | Kondadadi et al. | |
| 2018/0004547 | A1 | 1/2018 | Hayes et al. | |
| 2018/0196921 | A1 | 7/2018 | Devarakonda et al. | |
| 2019/0179653 | A1 | 6/2019 | Von Haden et al. | |
| 2019/0179898 | A1 | 6/2019 | Jetley et al. | |
| 2019/0179958 | A1 | 6/2019 | Curzi et al. | |

OTHER PUBLICATIONS

Naoya Namatame, A Distributed Resource Management Architecture for Interconnecting Web-of-Things using uBox. (Year: 2011).*
"International Search Report & Written Opinion for PCT Patent Application No. PCT/US18/062387", dated Feb. 15, 2019, 11 Pages.
"International Search Report & Written Opinion for PCT Patent Application No. PCT/US18/062388", dated Feb. 15, 2019, 12 Pages.
"Non Final Office Action Issued in U.S. Appl. No. 15/912,076", dated Jul. 26, 2019, 8 Pages.
"Notice of Allowance Issued in U.S. Appl. No. 15/912,076", dated Feb. 10, 2020, 10 Pages.
Bhawani, et al., "A Linguistically Driven Framework for Query Expansion via Grammatically Constituent Highlighting and Role-Based Concept Weighting", In Journal information Processing and Management vol. 52,Issue 2, Mar. 2016, 19 Pages.
James, et al., "Extraction and Disambiguation of Acronym-Meaning Pairs in Medline", In Journal of Medinfo vol. 10, 2001, 2001, 11 Pages.
"Non Final Office Action Issued in U.S. Appl. No. 15/923,962", dated Oct. 31, 2019, 16 Pages.
"Non Final Office Action Issued in U.S. Appl. No. 15/963,029", dated Nov. 18, 2019, 25 Pages.
Hoffman, Chris, "How to Install and Use Add-ins for Microsoft Office", Retrieved from: .howtogeek.com/260569/how-to-install-and-use-add-ins-for-microsoft-office/, Jul. 5, 2016, 7 Pages.
"International Search Report and Written Opinion Issued in PCT Application No. PCT/US2018/062386", dated Feb. 12, 2019, 10 Pages.
"International Search Report and Written Opinion Issued in PCT Application No. PCT/US18/061894", dated Feb. 12, 2019, 10 Pages.
"Final Office Action Issued in U.S. Appl. No. 15/963,029", dated Apr. 20, 2020, 10 Pages.
"Non Final Office Action Issued in U.S. Appl. No. 15/923,962", dated Jun. 15, 2020, 18 Pages.
"Final Office Action Issued in U.S. Appl. No. 15/923,962", dated Jan. 29, 2021, 20 Pages.

* cited by examiner

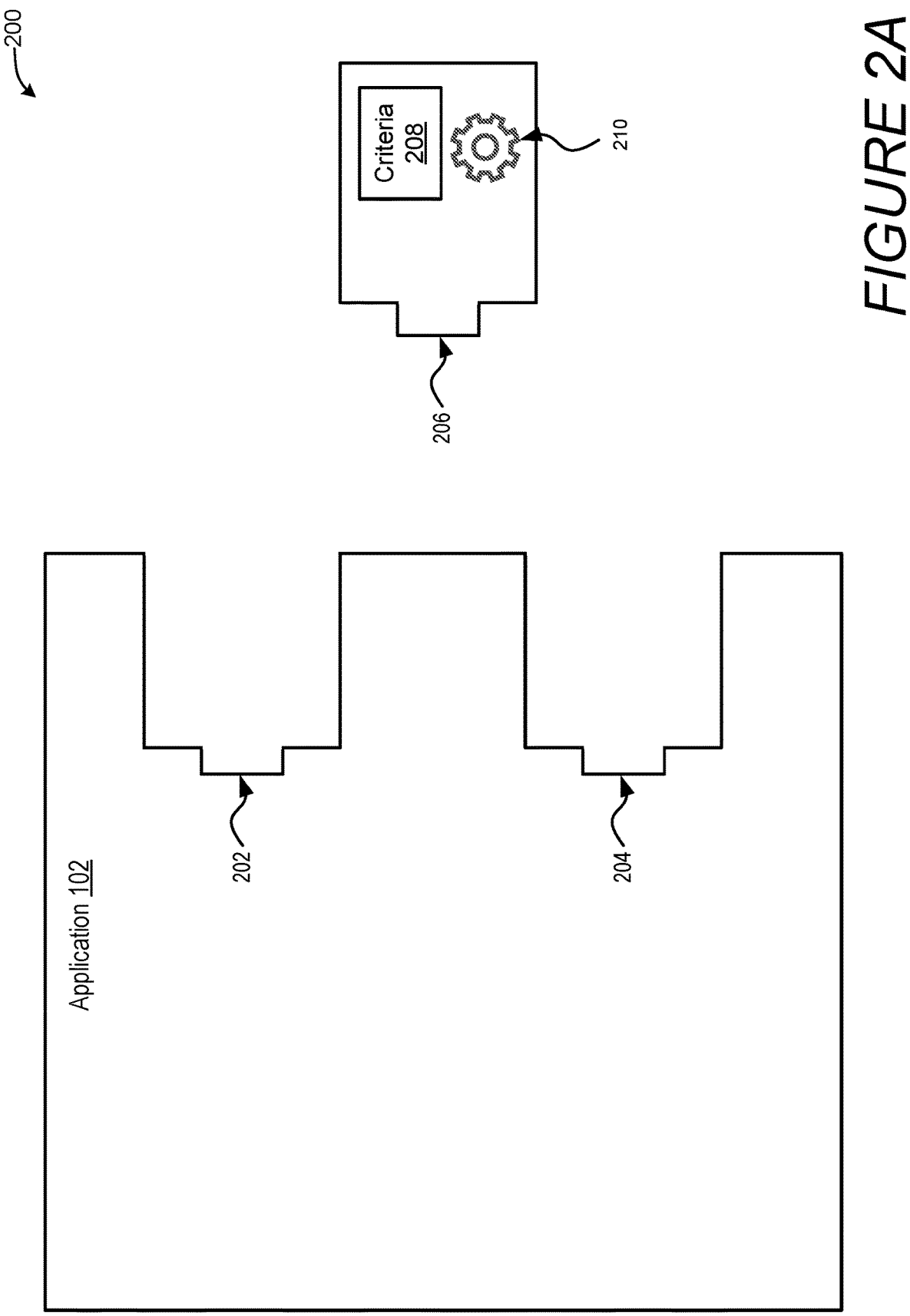

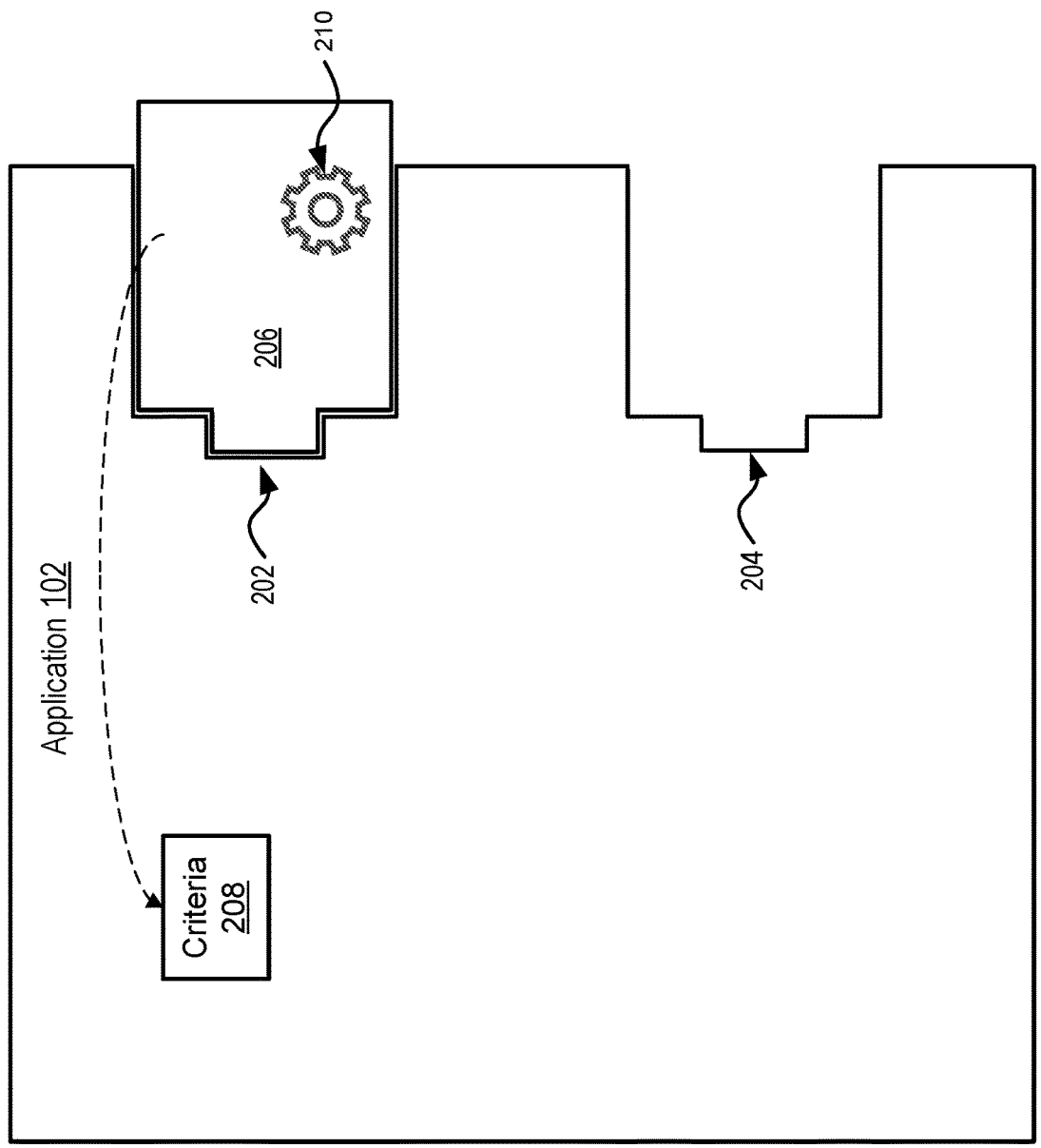

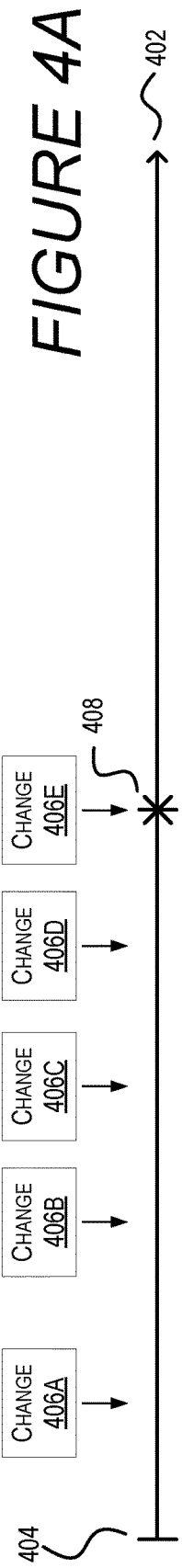
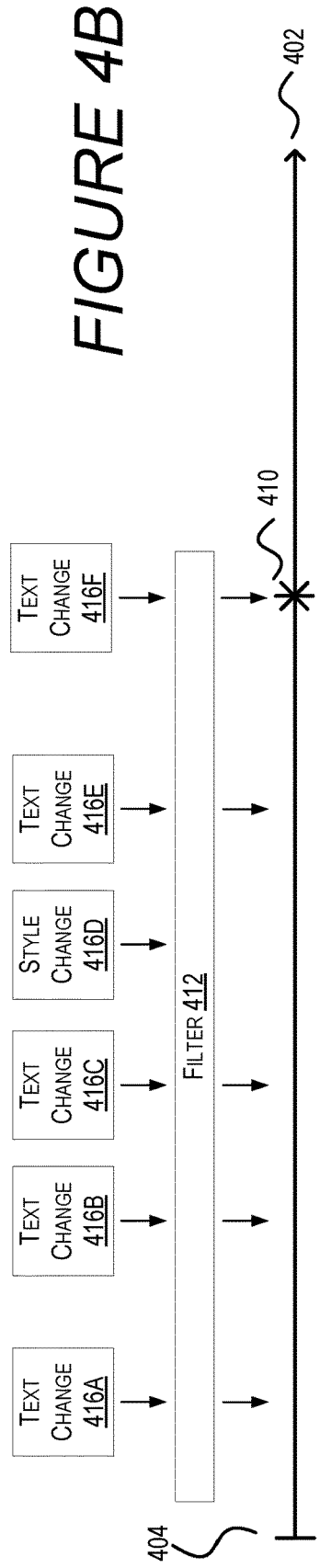
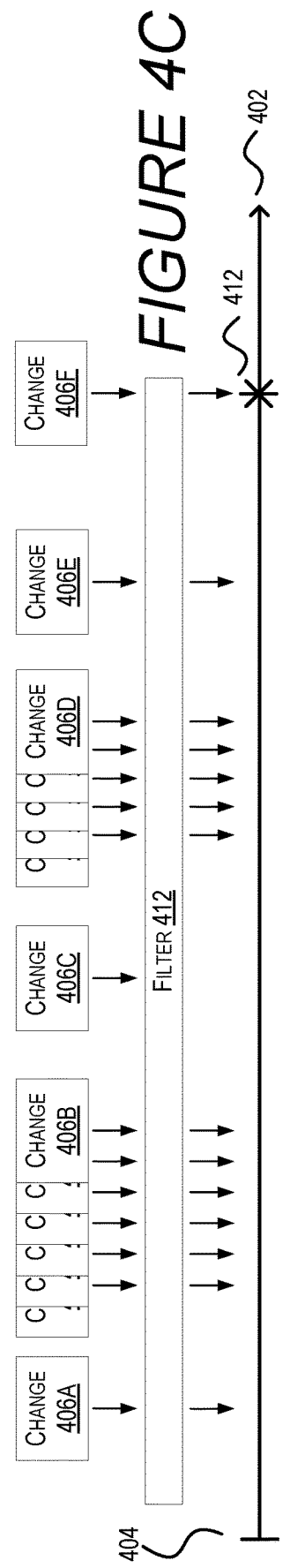

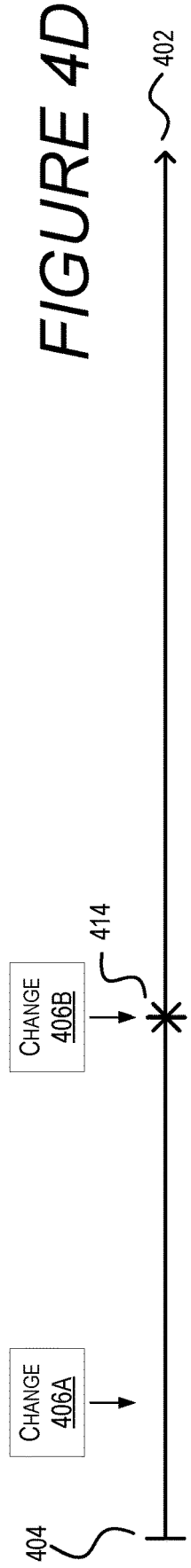
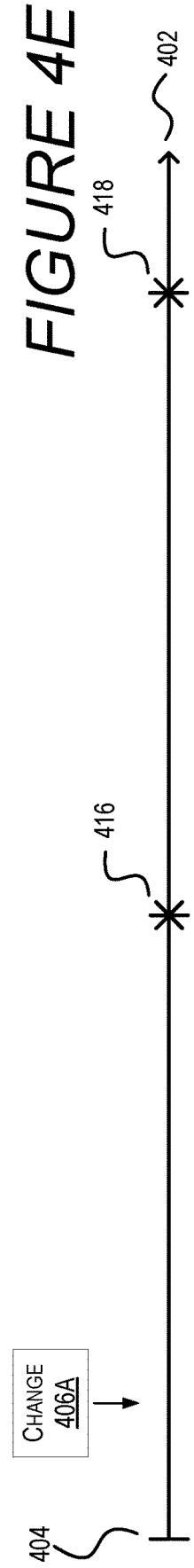
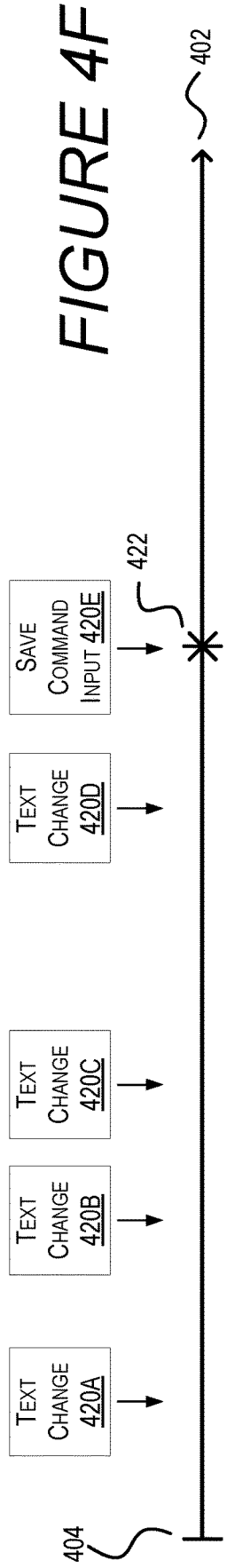

ENHANCED PROCESSING AND COMMUNICATION OF FILE CONTENT FOR ANALYSIS

CROSS-REFERENCE TO RELATED APPLICATIONS

This application claims the benefit of U.S. provisional patent application No. 62/598,459, entitled "CONTENT AUGMENTATION LOOP AND PERPETUAL WORKFLOWS FOR PRODUCTIVITY APPLICATIONS", which was filed on Dec. 13, 2017, and which is expressly incorporated herein by reference in its entirety.

BACKGROUND

Software add-ins can extend the functionality of an application. Among many other benefits, software add-ins can enable user customization, enhance the performance of an application, and enable third-party extensibility. For example, some add-ins can provide functionality that monitors a user's activity and respond to changes made to a document. However, some add-ins are limited in the amount of data that can be processed within a period of time. In some instances, when a user types quickly into a word processing application, such unrestrained streams of content changes can overwhelm an add-in. This shortcoming can cause other complications, such as degraded application performance, an unresponsive user interface, inefficient use of processing resources, etc.

These problems can be magnified when data is inefficiently communicated from an application to an add-in. For example, when a user is editing a document, some applications communicate large sections of content, e.g. whole paragraphs, to an add-in, instead of sending individual edits to the add-in. In such implementations, an add-in is required to process the entire section of content for a few edits that are made to the document, further degrading application performance and user interface responsiveness. Such shortcomings can lead to inefficient use of processing power as well as a loss of production in a work environment.

It is with respect to these and other technical challenges that the disclosure made herein is presented.

SUMMARY

The following disclosure provides a system that filters and batches changes made to a file to improve communication between an application and an add-in. Similar techniques may be applied to filter and batch changes for processing by the application itself, a built-in component of the application, or any other means of processing document content. Throughout this specification, where reference is made to an add-in, these other modes of processing are similarly contemplated. In some embodiments, the application batches a threshold number of changes made to a section of content of a file. The use of the threshold enables an application to regulate the rate of updates that are communicated between an application and an add-in. In some embodiments, changes can also be filtered based on the type of change (e.g. text changes, style changes, etc.) or the type of input that caused the change (e.g. keyboard input, cut and paste command, etc.). Filtering changes can reduce traffic between the application and the add-in, preventing the add-in from being overwhelmed and improving application responsiveness.

In some embodiments, an add-in provides a criteria to the application indicating when to provide a section of content. The criteria may include one or more thresholds, such as a defined number of changes, an amount of time since the section of content was last provided (hereinafter: "elapsed time"), or a combination thereof. Thresholds may be modified based on the section of content they are applied to. For example, an "elapsed time" threshold may be increased if the section of content has been subjected to a high rate of change. This allows a large number of changes to be batched before updating the add-in, reducing the rate of updates. Conversely, if a low rate of change is detected in a section of content, the "elapsed time" may be decreased, enabling the add-in to be quickly notified when changes are provided at a low rate.

In some embodiments, the criteria includes an executable function that determines whether to provide a section of content to the add-in. This allows complex criteria, such as the identification of acronyms in a paragraph. Such criteria can enable a system to filter data efficiently and remove unnecessary traffic between the application and the add-in.

In some embodiments an intermediate layer receives the criteria from the add-in and interacts with the application to determine when the criteria has been met. In such embodiments, an add-in can be made to work with different applications by converting underlying document content into an application neutral and content neutral tile and providing the tile to the add-in. For example, the same acronym processing add-in may be used in a word processing application to process paragraphs as well as a presentation application to process text-boxes.

The techniques disclosed herein improve existing systems by enabling an application and add-in to provide a responsive user interface while also improving the communication between an application and a software add-in.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 2A illustrates the application having an add-in capability.

FIG. 2B illustrates the add-in loaded into the application.

FIG. 3 illustrates a system diagram of components that process sections of document content into application-neutral tiles, which are then provided to the add-in.

FIG. 4A illustrates a timeline of change events associated with a section of content and a point in time when a threshold number of change events is met.

FIG. 4B illustrates a timeline of change events associated with a section of content, wherein the section of content is provided when a threshold number of filtered change events has been met.

FIG. 4C illustrates a timeline where a threshold amount of time elapsed before providing a section of content is extended due to a high rate of change events received.

FIG. 4D illustrates a timeline where a threshold amount of time elapsed before providing a section of content is contracted due to a low rate of change events received.

FIG. 4E illustrates a timeline where a section of content is periodically provided after a defined amount of time.

FIG. 4F illustrates a timeline where the provision of content is triggered by a defined sequence of event types.

DETAILED DESCRIPTION

Figure 1:
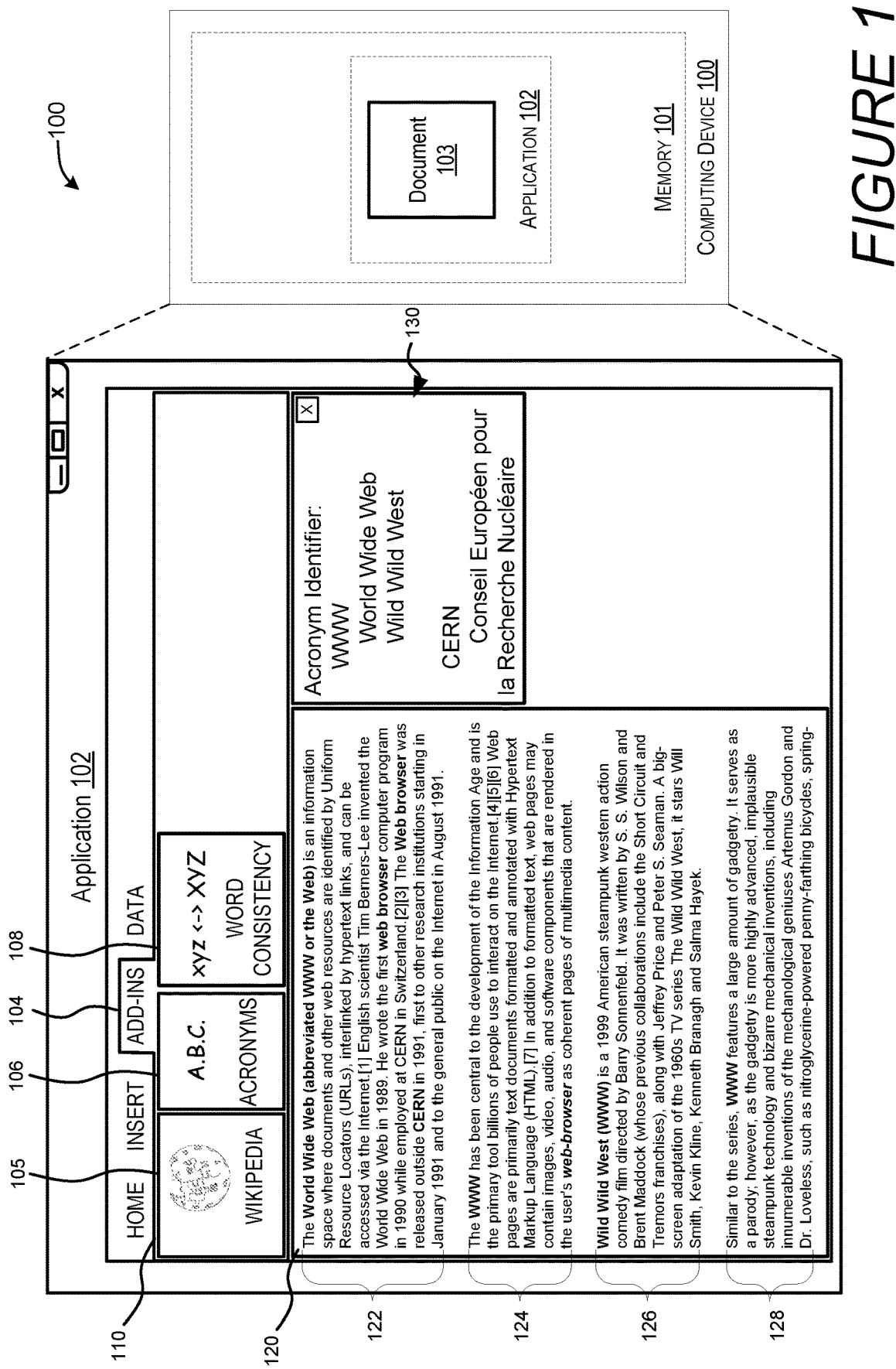
FIG. 1 illustrates an application and an add-in executing on a computing device containing a memory.

FIG. 1 illustrates an application 102 executing on a computing device 100 containing a memory 101. Application 102 is loaded into memory 101 and has opened document 103. A user interface of application 102 is depicted having a list of top-level menu items, including add-ins menu 104. Menu bar 110 includes icons associated with Wikipedia add-in 105, acronym add-in 106, and word consistency add-in 108. Document 103 is loaded into an authoring pane 120, while acronym add-in 106 is loaded into ancillary pane 130.

In some embodiments, application 102 may receive user input in authoring pane 120. User input may come in the form of keyboard input, which may include text input and command hotkey input. User input may also come in the form of mouse input, touch input, voice input, or the like, typically as a command. Some types of input, such as keyboard text input and some command input, e.g. a paste command, change the content of document 103.

In some embodiments, add-ins such as Wikipedia add-in 105, acronyms add-in 106, and word consistency add-in 108, receive indications of content changes to document 103. For example, as a user types "the World Wide Web (abbreviated WWW or the Web)" into document 103, acronyms add-in 106 will receive an indication that this content has been added. Similarly, if the user deletes the parenthetical, or even just one character, the acronyms add-in 106 will be notified of the content removal. In this way, add-ins are enabled access to document content in order to perform their intended function.

In some embodiments, document 103 is broken into sections of content. In a word processing document, sections of content may include paragraphs, such as paragraphs 122, 124, 126, and 128. However, a section of content may include any collection of content, including a word, sentence, column, page, chapter, or the like. Other types of applications may divide content into sections in other ways. For example, sections of content for a presentation application, such as Microsoft® PowerPoint®, may include text boxes. In some embodiments, changes are tracked per section, and once a threshold or other criteria is met, the section may be provided to an add-in in its entirety. In some embodiments, the section may first be converted to a normalized format, e.g. a tile, that is application and source content neutral.

FIG. 2A illustrates the application 102 having an add-in capability. Application 102 may include add-in sockets 202 and 204 designed to interface with an add-in such as add-in 206. In some embodiments, add-in 206 includes a criteria 208 defining one or more thresholds or other means of indicating when changes to a section of content meet the criteria. Add-in 206 may also include configuration setting 210 enabling user modification of criteria 208. For example, a criteria 208 may contain a threshold number of changes to a section of content. When the threshold number of changes is detected, the section of content will be provided to the add-in. A user may desire to reduce the threshold, e.g. by modifying a value in configuration settings 210 to reduce the number of changes before the add-in receives the section of content. This change may reduce the time between registering a change in the application and providing the change to an add-in at the expense of system performance.

FIG. 2B illustrates the add-in 206 loaded into the application 102. In some embodiments, criteria 208 has been registered with application 102, enabling add-in 206 (in conjunction with configuration settings 210) to define the criteria under which sections of content will be provided to itself. However, in other embodiments, application 102 supplies a criteria for providing sections of content.

Figure 3:
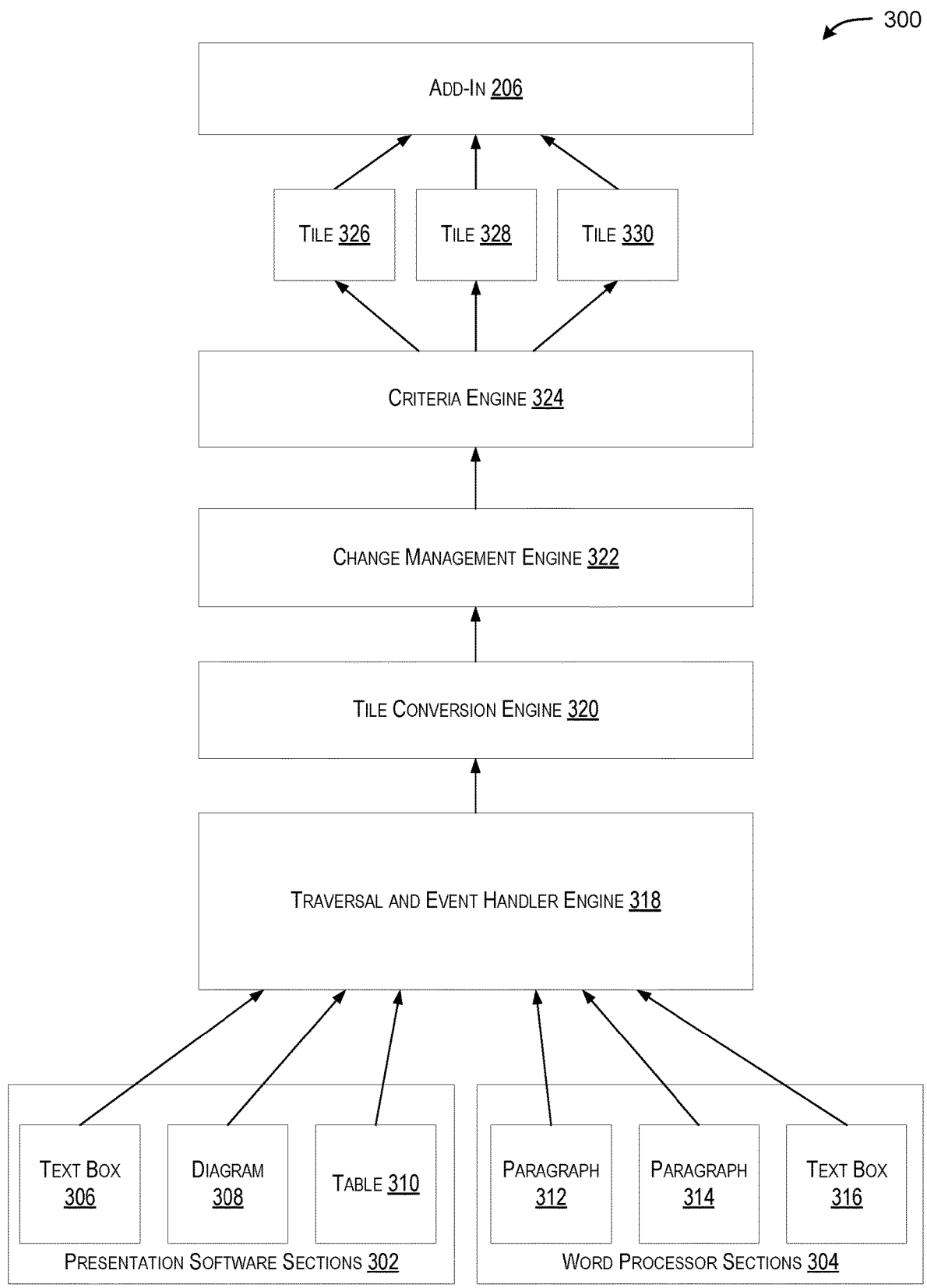

FIG. 3 illustrates a system diagram 300 of components that process sections of document content into application-neutral tiles, which are then provided to the add-in. In some embodiments, presentation software sections 302 and word processor sections 304 contain sections of content that are provided to add-in 206. For example, text box 306, diagram 308, table 310, paragraphs 312 and 314 and text box 316, are all sections of content.

In some embodiments, upon loading a document, traversal and event handler engine 318, a component of application 102, traverses each section of content of the document. Additionally or alternatively, once the document has been loaded and a user has begun to edit the document, traversal and event handler engine 318 may receive user input events associated with sections of content of the document.

In some embodiments, sections of content processed by the traversal and event handler engine 318 are provided to a tile conversion engine 320. Tile conversion engine 320 converts document and application specific sections of content, e.g. word processing paragraph 312 or presentation software text box 306, into tiles that are application neutral and content source neutral. Not only does tile conversion engine 320 generate tiles independent of the application they came from, tile conversion engine 320 may also convert different types of content from a single application into content source neutral tiles. For example, word processing sections 304 may include paragraph 312 and text box 316, both of which may be converted to application neutral and content source neutral tiles. These tiles may in turn be provided to add-in 206. In this way, add-in 206 may be used in a wide variety of applications without modification.

In some embodiments, change management engine 322 performs a "diff" operation, isolating newly created, deleted, or changed portions of the tile. Change management engine 322 may also determine if a tile has been split into two tiles, whether a tile has been pasted into the application, or the like.

If a change has been determined to have occurred, the tile is processed by criteria engine 324. Criteria engine 324 applies a criteria to the changed tile, e.g. one or more thresholds, an executable function, or the like. If the changes to the tile are determined to meet the criteria, the tile, e.g. tile 326, 328, or 330, may be provided to add-in 206 for processing.

FIG. 4A illustrates a timeline 402 of change events associated with a section of content and a point in time 408 when a threshold number of change events has been met. FIG. 4A includes time marker 404 indicating when the section of content was loaded. Alternatively, time marker 404 may refer to the time when the section of content was last provided to the add-in. Change events 406A-406E represent changes to text in the section of content, changes to style (font, font weight, font style, font color, font size, spacing, tab stops, etc.) in the section of content, or any other type of change applicable to the section of content. In some embodiments, changes to a section of content are associated with a section ID, e.g. a paragraph ID, such that changes to different sections of content can be concurrently tracked. FIG. 4A depicts a criteria including a threshold of 5 changes, as illustrated by the $5^{th}$ change, 406E, causing the threshold to be met.

FIG. 4B illustrates a timeline of change events 402 associated with a section of content, wherein the section of content is provided at time marker 410 when a threshold number of filtered change events has been met. FIG. 4B illustrates a criteria including a threshold of 5 change events coupled with a filter 412 that filters out style changes. Thus, text changes 416A-416C and 416E-416F pass through filter 412, while style change 416D is blocked. As such, even though text change 416F is the $6^{th}$ change event received, it is the $5^{th}$ change event to pass through filter 412, and so text change 416F is what causes the section of content to be provided. In some embodiments, filter 412 defines one or more types of change events to filter out, i.e. to prevent from applying to the criteria. However, filter 412 may also define one or more types of changes to "filter in", e.g. a whitelist of event types to allow to be applied to the criteria while blocking any others.

FIG. 4C illustrates a timeline 402 where a threshold amount of time elapsed before providing a section of content is extended due to a high rate of change events received. FIG. 4D illustrates a timeline 402 where a threshold amount of time elapsed before providing a section of content is contracted due to a low rate of change events received.

FIGS. 4C and 4D illustrate criteria in which a rate of change to a section of content alters the threshold amount of time elapsed. FIG. 4C illustrates a high rate of change to the section of content, causing the threshold amount of time elapsed to be extended (increased, added to, etc.), while FIG. 4D illustrates a low rate of change to the section of content, causing the threshold amount of time elapsed to be contracted (decreased, subtracted from, etc.). These changes are based on the intuition that batching changes by number without regard to rate and time, e.g. into batches of five changes, may still cause the add-in to be overwhelmed, or alternatively, to wait too long to be updated.

For example, a fast typist may key in 100 words per minute, or 500 keystrokes per minute. At this rate, batching changes into groups of five would still cause the section of content to be provided to the add-in 100 times per minute, which depending on the workload, may overwhelm the add-in, degrade application performance, cause UI stutter or lag, etc.

At the same time, when changes trickle in slowly to a section of content, waiting for a $5^{th}$ change may mean waiting for a change that happens hours or days later, if at all. In these scenarios, the add-in would not be provided with the updated section of content soon enough to display to date information.

These two examples are one of many possible combinations of change frequency and amounts of time elapsed. In some embodiments, add-ins provide a plurality of change frequencies and corresponding amounts of time, such that as change rates in a section of content vary, the amount of time to wait before providing the section of content varies accordingly.

For example, FIG. 4C determines that the criteria has been met at time marker 412, while FIG. 4D determines that the criteria has been met at time marker 414, which is considerably sooner even though FIG. 4D has received only 2 changes.

FIG. 4E illustrates a timeline 402 where a section of content is periodically provided after a defined amount of time. In some embodiments, sections of content may be provided periodically, e.g. every 3 seconds as depicted by time markers 416 and 418, to an add-in, regardless of how many changes have occurred. In other embodiments, the application may periodically check a section of content for changes, e.g. every 3 seconds, but only provide an update when a threshold number of changes has occurred. For example, the application may periodically check a section of content for changes, but only provide an update if a change actually has been made. In some embodiments, when a section of content has been deleted within the period of time, the add-in may be provided with an ID of the section of content and an indication that the section of content has been deleted—even if text had been added to the section of content before it was deleted.

FIG. 4F illustrates a timeline where the provision of content is triggered by a defined sequence of event types. While any sequence or pattern of event content and event type are contemplated, FIG. 4F illustrates a sequence of one or more text changes, illustrated as text changes 420A-D followed by a save command input 420E, which triggers providing a section of content. In another embodiment, in addition to triggering based on event types, triggering may also be based on event content. For example, the defined sequence of event types exclude consideration of text changes that consist of white space.

Figure 5:
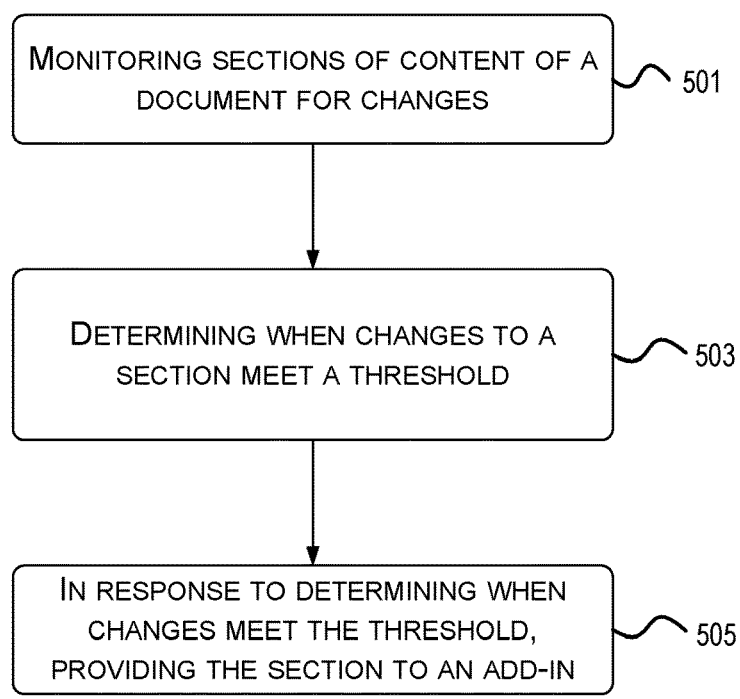
FIG. 5 illustrates aspects of a routine for enabling aspects of the techniques disclosed herein as shown and described below.

FIG. 5 illustrates aspects of a routine 500 for enabling aspects of the techniques disclosed herein as shown and described below. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programming interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it can be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 5, the routine 500 begins at operation 501 where sections of content of a document are monitored for changes. In some embodiments, the sections of content reflect natural divisions in the document, e.g. paragraphs of a word processing document, text boxes of presentation slide deck, cells of the spreadsheet, or the like. However, a document may be divided into sections of any size, shape, or makeup.

In some embodiments, sections of content are monitored for changes by capturing user input events and associating them with document changes. User input events may be raised in response to user keystrokes, mouse moves, mouse clicks, or other user actions. Sections of content may also be monitored for changes by leveraging an application program interface (API) exposed by the application.

In some embodiments, one or more types of changes are filtered out, i.e. not applied to a threshold or other criteria. A criteria may filter out changes based on the type of change (e.g. text change, style change), type of input that created the change (keyboard text input, copy and paste command, split one paragraph and to), etc.

In other embodiments, a criteria may be based at least in part on whether a section of content was created by splitting an existing section of content into two sections of content. For example, an add-in that formats paragraphs may want to be alerted when a new paragraph has been created and/or when an old paragraph has been significantly modified. Similarly, a criteria may be based at least in part on whether a section of content was created by a paste operation.

In some embodiments, an add-in may provide multiple criteria, each criteria associated with a different piece of functionality within the add-in. For example, a paragraph formatting add-in may want to distinguish between paragraphs that are pasted in using a cut and paste command, paragraphs that are created by splitting an existing paragraph, and paragraphs that are created de novo.

In some embodiments, changes are batched, i.e. stored, until the threshold or other criteria has been met. Then, when the section of content is provided to the add-in, the batched changes may also be provided. In this way, the add-in may be relieved of having to determine what has changed in the section of content.

In some embodiments, the threshold or other criteria is modifiable by a configuration setting included in the add-in. The configuration setting may be set by a user to increase or decrease a threshold, or eliminate the threshold entirely.

In some embodiments, the criteria includes an executable function that accepts as input a section of content, and which returns as output a Boolean value indicating whether the section of content should be provided to the add-in or not. In this way, add-ins may deeply integrate with the application to determine whether changes to a section of content are relevant. In one embodiment, an acronyms add-in may provide an executable function as part of a criteria. The executable function may scan a section of content for potential acronyms, returning "False" when none are found, thereby not providing sections of content that aren't of interest to the add-in. When an acronym is found, "True" may be returned, which may in one embodiment cause the section of content to immediately be provided to the add-in. However, in other embodiments, the section of content may be added to a queue of sections of content to be provided once a threshold such as CPU or network bandwidth availability is met. This technique may be particularly useful when the add-in is located on a remote computer, or when the add-in includes a time consuming process, such as invoking a web or cloud-based service to find expansions to acronyms.

In some embodiments, the executable function may return a more complex data type, such as an enumeration (i.e. a data type consisting of a set of named values), allowing more nuanced actions than providing a section of content in its entirety or not. For example, an application may support executable functions that indicate whether to return a changed portion of a section of content, the entire section of content, or nothing at all.

In another example, an enumeration may indicate a priority associated with providing the section of content to the add-in. For instance, in the context of an acronym processing add-in, the executable function may detect an acronym in changed text (e.g. text that was created or edited within a defined period of time, such as 20 seconds), returning a value of the enumeration indicating the section of content is high priority. In response, the application may immediately provide the section of content to the add-in for processing. However, if the executable function detects an acronym in other text, i.e. text that hasn't changed recently, it may return an enumeration value indicting a low priority (based on the intuition that the existing acronym has likely already been processed). In turn, the application may add the section of content to a queue that provides sections of content once a threshold is met. For example, the queue may provide sections of content when a processor or network usage threshold falls below a defined level. Finally, if the executable function does not detect an acronym anywhere in the section of content, it may return an enumeration value indication the section of content should not be provided to the add-in.

In some embodiments, the executable function may return a set of flags or other complex objects, enabling additional information, commands, functions, parameters, etc. to be conveyed to the application. For example, a flag or other indicator returned from the executable function may indicate that an additional function should be run, e.g. a next function in a sequence. Additionally or alternatively, the executable function may return an indication of (e.g. a reference or pointer to) a next function to run. Parameters to be provided to the next function may or may not be included. Chained functions may be useful if the initial function is not particularly intensive but can perform an initial filter on sections of content, while a subsequent function may be more intensive and thus only run when the first function determines it is warranted. Chaining functionality in this way may enable executable functions to be used by multiple add-ins.

Next, at operation 503, a determination is made when the changes to a section of content meet a threshold. In some embodiments, the threshold includes an amount of time that has elapsed since the most recent change to the section of content. Additionally or alternatively, the threshold includes a number of edits to the section of content since the section of content was last provided to the add-in.

In some embodiments, the threshold is provided by the add-in. This allows add-ins to provide thresholds suitable to their specific functionality. For example, an add-in that performs extensive processing on a section of content may choose to be notified of changes less frequently, in order to allow previous changes to finish processing, and to avoid consuming too many processing resources. On the other hand, an add-in that performs minimal processing on a section of content may choose to be notified as each character changes. In this way, a maximum level of responsiveness can be achieved.

Furthermore, the threshold may be one of a plurality of thresholds comprising a criteria. The plurality of thresholds may be applied in the alternative (i.e. either or) or conjunctively (i.e. the application will wait until all of the thresholds have been satisfied). In other embodiments, the thresholds may be modified based on an attribute of the section of content. For example, if a section of content is being changed frequently, a threshold amount of time to wait before providing the section of content may be increased. In some embodiments, an add-in may provide a plurality of ranges of change frequencies and a corresponding plurality of amounts of time. When a section of content is being changed at a rate that falls within one of the ranges, a corresponding amount of time is allowed to elapse before providing the section of content to the add-in.

Next, at operation 505, in response to determining that the threshold has been met, the section of content is provided to the add-in. Additionally or alternatively, upon loading a document, every section of content in the document is provided to the add-in. In some embodiments, as discussed above in conjunction with FIG. 3, the section of content may be converted to an application and source content neutral tile that is provided to the add-in.

Figure 6:
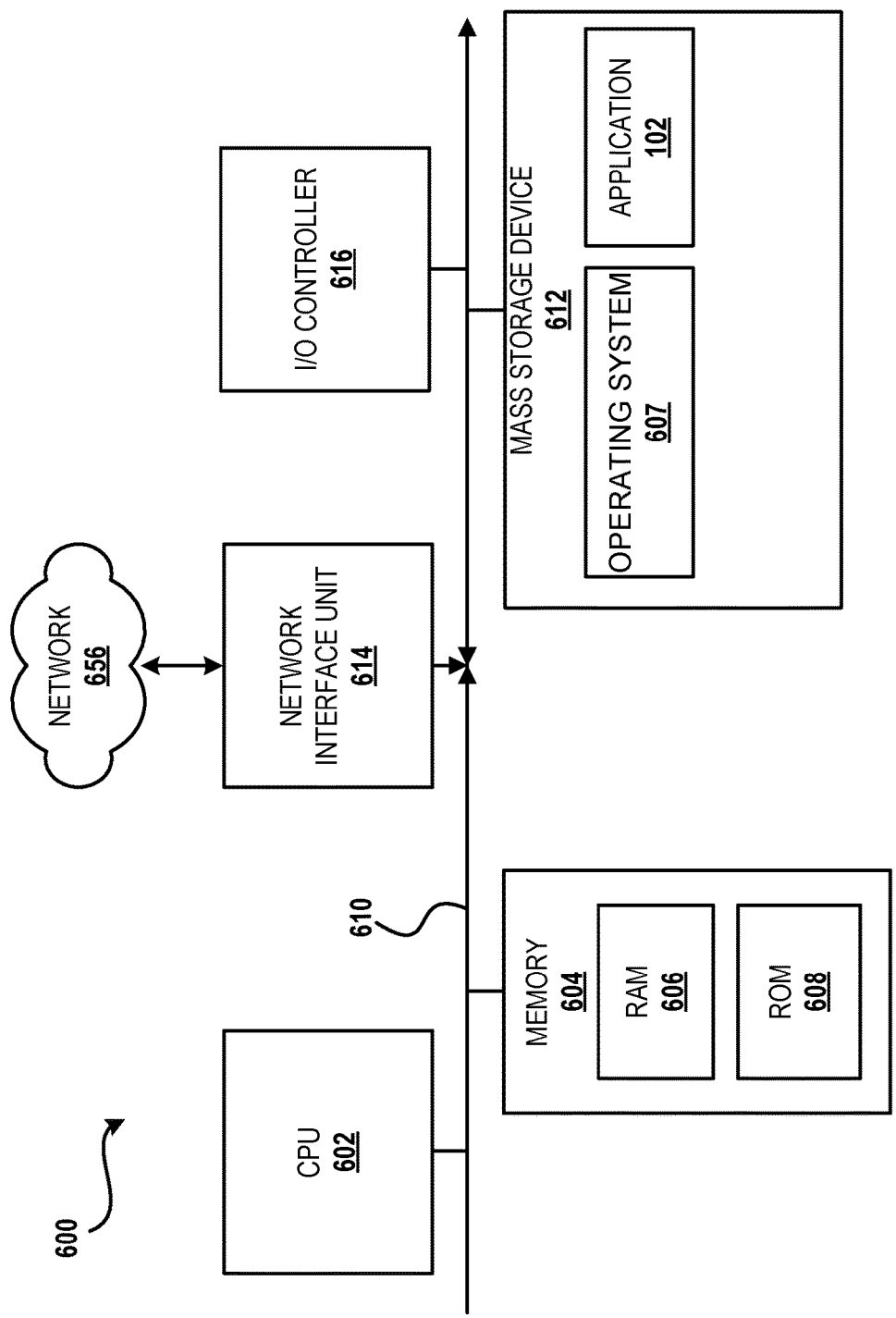
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a computer, such as a computing device executing application 102 (FIG. 1), capable of executing the program components described herein. Thus, the computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs 102.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

The disclosure presented herein also encompasses the subject matter set forth in the following clauses:

Clause 1. A method for improving communication between an application and an add-in, the method comprising: monitoring sections of content of a document for changes; determining when the changes to a section of content reach a threshold, wherein the threshold comprises at least one of: an amount time since a most recent change or a number of edits since the section of content was last provided to the add-in; and in response to determining that the threshold has been met, communicating the section of content from the application to the add-in.

Clause 2. The method of Clause 1, further comprising batching changes to the section of content until the threshold has been met, wherein communicating the section of content to the add-in includes communicating the batched changes to the add-in.

Clause 3. The method of Clause 1, wherein the add-in includes a configuration setting that modifies the threshold based on a rate of change applied to the section of content.

Clause 4. The method of Clause 1, wherein the threshold defines a plurality of rates of change and a corresponding plurality of amounts of time, and wherein determining when the changes to the section of content meet the threshold comprises: determining a rate of change in the section of content; and determining whether an amount of time since the most recent change to the section of content is greater than the defined amount of time corresponding to the determined rate of change.

Clause 5. The method of Clause 4, wherein amounts of time corresponding to faster rates of change are larger than amounts of time corresponding to slower rates of change.

Clause 6. The method of Clause 1, further comprising: in response to loading the document, determining when the threshold has been met in sections of content of the loaded document; and communicating the determined sections of content to the add-in.

Clause 7. A computing device for improving communication between an application and an add-in, comprising: one or more processors; a memory in communication with the one or more processors, the memory having computer-readable instructions stored thereupon which, when executed by the one or more processors, cause the computing device to: receive a criteria from the add-in defining when to provide a section of content to the add-in; divide the document into sections of content; monitor the sections of content for changes; determine when the changes to a section of content meet the criteria; and in response to the determination that the criteria has been met, provide the determined section of content from the application to the add-in.

Clause 8. The computing device of Clause 7, wherein the criteria includes an executable function that processes a section of content, and wherein determining when the changes to a section of content meet the criteria includes applying the executable function.

Clause 9. The computing device of Clause 8, wherein the executable function determines whether a section of content contains an acronym.

Clause 10. The computing device of Clause 9, wherein the add-in: identifies an acronym in the provided section of content; determines one or more expansions associated with the acronym; and displays a list of acronyms and associated expansions in an ancillary pane of the application.

Clause 11. The computing device of Clause 7, wherein the criteria includes a plurality of thresholds, and wherein determining when the changes to a section of content meet the criteria includes determining when the changes to the section of content meet the plurality of thresholds.

Clause 12. The computing device of Clause 7, wherein the criteria defines one or more types of changes to filter while determining when the criteria has been met.

Clause 13. The computing device of Clause 7, wherein the criteria defines one or more types of input received from a user to filter out while determining when the criteria has been met.

Clause 14. The computing device of Clause 7, wherein the criteria includes an amount of time to wait between checking a section of content for changes.

Clause 15. A method for improving communication between an application and a processing component, comprising: receiving a criteria from the processing component defining when to provide a section of content to the processing component; monitoring sections of content of a document for changes; determining when the changes to a section of content since the last time the section of content was provided to the processing component meet the criteria; and in response to the determination that the criteria has been met, providing the determined section of content from the application to the processing component.

Clause 16. The method of Clause 15, wherein the processing component is compatible with a plurality of applications by interfacing with an object model shared between the plurality of applications.

Clause 17. The method of Clause 15, wherein the document includes a word processing document and the sections of content include paragraphs.

Clause 18. The method of Clause 15, wherein the criteria is based in part on whether a section of content was created in response to dividing an existing section of content into two sections of content.

Clause 19. The method of Clause 15, wherein the criteria is based in part on whether a section of content was created by a paste operation.

Clause 20. The method of Clause 15, wherein the criteria defines one or more style changes within the section of content to ignore.

It should be appreciated that the above-described subject matter may be implemented as a computer-controlled apparatus, a computer process, a computing system, or as an article of manufacture such as a computer-readable storage medium. Among many other benefits, the techniques herein improve efficiencies with respect to a wide range of computing resources. For instance, human interaction with a devices and systems may be improved as the use of the techniques disclosed herein enable users and individuals remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method for improving communication between an application and an add-in to the application, the method comprising:
    monitoring, with the application, changes to a document opened for editing in the application, wherein the changes are caused by input events received by the application while the document is open for editing;
    determining when changes to a section of the document meet a threshold based in part on a number of edits since the section of the document was last provided to the add-in;
    batching the changes to the section of the document until the threshold has been met;
    in response to determining that the threshold has been met, communicating the section of the document from the application to the add-in; and
    communicating the batched changes to the add-in.

2. The method of claim 1, wherein the add-in includes a configuration setting that modifies the threshold based on a rate of the changes applied to the section of the document.

3. The method of claim 1, wherein the threshold defines a plurality of rates of change and a corresponding plurality of amounts of time, and wherein determining when the changes to the section of the document meet the threshold comprises:

determining a rate of change in the section of the document; and determining whether an amount of time since the most recent change to the section of the document is greater than the defined amount of time corresponding to the determined rate of change.

4. The method of claim 3, wherein amounts of time corresponding to faster rates of change are larger than amounts of time corresponding to slower rates of change.

5. The method of claim 1, further comprising:

in response to loading the document, determining when the threshold has been met in sections of the loaded document; and communicating the determined sections of content to the add-in.

6. A computing device for improving communication between an application and an add-in to the application, comprising:

one or more processors;

a memory in communication with the one or more processors, the memory having computer-readable instructions stored thereupon which, when executed by the one or more processors, cause the computing device to:

divide a document opened for editing in the application into sections;

receive a criteria from the add-in defining when to provide a section of the document to the add-in;

monitor, with the application, the sections of the document for changes caused by user input events received by the application while the document is opened for editing in the application;

determine when changes to a section of the document meet the criteria;

batch the changes to the section of the document until the criteria has been met;

in response to the determination that the criteria has been met, provide the determined section of the document from the application to the add-in; and communicate the batched changes to the add-in.

7. The computing device of claim 6, wherein the criteria includes an executable function that processes a section of the document, and wherein determining when the changes to a section of the document meet the criteria includes applying the executable function.

8. The computing device of claim 7, wherein the executable function determines whether a section of the document contains an acronym.

9. The computing device of claim 8, wherein the add-in:

identifies an acronym in the provided section of the document;

determines one or more expansions associated with the acronym; and displays a list of acronyms and associated expansions in an ancillary pane of the application.

10. The computing device of claim 6, wherein the criteria includes a plurality of thresholds, and wherein determining when the changes to a section of the document meet the criteria includes determining when the changes to the section of the document meet the plurality of thresholds.

11. The computing device of claim 6, wherein the criteria defines one or more types of changes to filter out while determining when the criteria has been met.

12. The computing device of claim 6, wherein the criteria defines one or more types of input received from a user to filter out while determining when the criteria has been met.

13. The computing device of claim 6, wherein the criteria includes an amount of time to wait between checking a section of the document for changes.

14. A method for improving communication between an application and an add-in associated with the application, comprising:

receiving a criteria from the add-in defining when to provide a section of a document to the add-in;

monitoring, with the application, sections of the document for changes, wherein the changes are caused by user input events received by the application while the document is open in the application for editing;

determining when one or more changes to the section of the document since the section of the document was last provided to the add-in meet the criteria;

batching changes to the section of the document until the criteria has been met;

in response to the determination that the criteria has been met, providing the section of the document from the application to the add-in; and communicating the batched changes to the processing component.

15. The method of claim 14, wherein the add-in is compatible with a plurality of applications by interfacing with an object model shared between the plurality of applications.

16. The method of claim 14, wherein the document includes a word processing document and the sections of the document include paragraphs.

17. The method of claim 14, wherein the criteria is based in part on whether the section of the document was created in response to dividing an existing section of the document into two sections of the document.

18. The method of claim 14, wherein the criteria is based in part on whether a section of the document was created by a paste operation.

19. The method of claim 14, wherein the criteria defines one or more style changes within the section of the document to ignore.

* * * * *